United States Patent
Yoshida

(10) Patent No.: US 10,688,582 B2
(45) Date of Patent: Jun. 23, 2020

(54) ARC SENSOR ADJUSTMENT DEVICE AND ARC SENSOR ADJUSTMENT METHOD

(71) Applicant: FANUC CORPORATION, Yamanashi (JP)

(72) Inventor: Shigeo Yoshida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/871,556

(22) Filed: Jan. 15, 2018

(65) Prior Publication Data

US 2018/0207740 A1 Jul. 26, 2018

(30) Foreign Application Priority Data

Jan. 26, 2017 (JP) ................................. 2017-012240

(51) Int. Cl.
*B23K 9/06* (2006.01)
*B23K 9/073* (2006.01)
*B23K 9/02* (2006.01)
*B23K 9/127* (2006.01)

(52) U.S. Cl.
CPC .......... *B23K 9/0737* (2013.01); *B23K 9/0216* (2013.01); *B23K 9/0732* (2013.01); *B23K 9/127* (2013.01)

(58) Field of Classification Search
CPC ...... B23K 9/00; B23K 9/0737; B23K 9/0732; B23K 9/073; B23K 9/06; B23K 9/067
USPC .... 219/124.1, 124.34, 124.32, 124.21, 130.1
See application file for complete search history.

(56) References Cited

U.S. PATENT DOCUMENTS

| | | | | |
|---|---|---|---|---|
| 4,631,385 A * | 12/1986 | Rothermel | ............... | B23K 9/12 219/124.03 |
| 4,870,247 A * | 9/1989 | Fukuoka | ............... | B23K 9/0216 219/125.1 |
| 6,335,511 B1 * | 1/2002 | Rothermel | ............. | B23K 9/091 219/124.03 |
| 6,429,404 B1 * | 8/2002 | Suzuki | ................. | B23K 9/0216 219/124.34 |
| 7,999,208 B2 | 8/2011 | Shigeyoshi | | |
| 9,044,817 B2 * | 6/2015 | Fukunaga | ............... | B23K 9/126 |

(Continued)

FOREIGN PATENT DOCUMENTS

| AT | 510886 A1 | 7/2012 |
|---|---|---|
| CN | 101157155 A | 4/2008 |

(Continued)

*Primary Examiner* — Dana Ross
*Assistant Examiner* — Ayub A Maye
(74) *Attorney, Agent, or Firm* — RatnerPrestia

(57) ABSTRACT

An arc sensor adjustment device and adjustment method for carrying out highly-accurate copying control. A welding system includes a welding torch, a welding power source that supplies power to the welding torch, a robot and a robot controller that cause the welding torch to oscillate, and an arc sensor that obtains a welding current or a welding voltage generated during welding while oscillating the welding torch. The arc sensor obtains a welding current or a welding voltage generated during calibration, in which welding is carried out while oscillating the welding torch in an up-down direction, calculates, on the basis of the obtained welding current or welding voltage, a correction amount for the position of the welding torch during welding carried out while oscillating the welding torch in a left-right direction, and applies the calculated correction amount to copying control.

4 Claims, 2 Drawing Sheets

(56) References Cited

U.S. PATENT DOCUMENTS

| | | |
|---|---|---|
| 9,468,987 B2 | 10/2016 | Aoki et al. |
| 9,623,507 B2 | 4/2017 | Shigeyoshi |
| 2009/0107969 A1* | 4/2009 | Asai ................. B23K 9/0216 219/124.1 |
| 2013/0256287 A1* | 10/2013 | Cole .................. B23K 9/0216 219/122 |
| 2013/0299475 A1 | 11/2013 | Aoki et al. |
| 2014/0014638 A1 | 1/2014 | Artelsmair |
| 2014/0258447 A1* | 9/2014 | Cole ...................... H04L 67/06 709/217 |
| 2015/0114940 A1* | 4/2015 | Hutchison ............ B23K 9/1062 219/130.33 |

FOREIGN PATENT DOCUMENTS

| | | |
|---|---|---|
| CN | 102151949 A | 8/2011 |
| CN | 102189313 A | 9/2011 |
| CN | 103124612 A | 5/2013 |
| CN | 105728904 A | 7/2016 |
| DE | 60030348 T2 | 4/2007 |
| EP | 1036627 A2 | 9/2000 |
| JP | S61-074778 A | 4/1986 |
| JP | H09-070663 A | 3/1997 |
| JP | 2009-183976 A | 8/2009 |
| JP | 2010120042 A | 6/2010 |
| JP | 2014030841 A | 2/2014 |

\* cited by examiner

ARC SENSOR ADJUSTMENT DEVICE AND ARC SENSOR ADJUSTMENT METHOD

CROSS-REFERENCE TO RELATED APPLICATIONS

This application is a new U.S. Patent Application that claims benefit of Japanese Patent Application No. 2017-012240, filed Jan. 26, 2017, the disclosure of this application is being incorporated herein by reference in its entirety for all purposes.

BACKGROUND OF THE INVENTION

1. Field of the Invention

The present disclosure relates to an arc sensor adjustment device and adjustment method.

2. Description of the Related Art

In groove welding, fillet welding, etc., there are cases where a copying control of a welding torch on a weld line is performed during what is known as "weaving", where the welding torch is caused to oscillate in a left-right direction with respect to the weld line by using a robot or the like. Arc sensors are known as means for correcting the position of the welding torch relative to an object to be welded by using changes in the welding phenomenon arising during weaving (e.g. a welding current waveform).

As an example of a known technique in the related art, JP 2009-183976 A discloses "a welding control method, used in welding where a distance between a welding wire and an object to be welded varies during weaving, when welding while causing a welding torch to weave, includes detecting changes in a welding current by sampling the welding current in synchronization with a weaving period and performing copying control of the welding torch along a weld line, wherein a peak value of the welding current is detected from a change in the welding current, and the timing of the sampling of the welding current is set so as to match or approach the timing at which the welding current peak value is detected".

JP S61-074778 A describes that "when a center of oscillation of a welding torch T has shifted from a desired position relative to a welding groove, a suitable gain coefficient suitable for welding conditions is used to calculate a control amount applied to the center of oscillation and correct that shift, and thus the welding groove can be suitably copied by the welding torch, and favorable arc welding can be carried out".

Furthermore, JP H09-070663 A discloses "an arc sensor adjustment apparatus, in an arc sensor system that performs copying control of a weld line, the apparatus provided with: sensor signal measuring means for measuring an output signal of an arc sensor at the arc sensor and a predetermined target position; sensor characteristic storage means for storing an output signal of the sensor signal measuring means as arc sensor characteristics; parameter setting means for setting parameters of the arc sensor; and copying control trajectory estimating means for estimating a copying control trajectory of a welding torch on the basis of the arc sensor characteristics and the arc sensor parameters".

In the related art, when carrying out adjustment tasks such as setting the timing of sampling arc sensor current, setting a gain coefficient, etc., unpredictable factors such as dimensional error in the welding subject and bending in the welding wire have made it difficult to calculate highly-accurate adjustment results.

SUMMARY OF THE INVENTION

One aspect of the present disclosure is an arc sensor adjustment device in a welding system including a welding torch, a welding power source configured to supply power to the welding torch, an oscillation device configured to cause the welding torch to oscillate, and an arc sensor configured to obtain a welding current or a welding voltage generated when copying control is carried out while power is supplied to the welding torch from the welding power source and the welding torch is caused to oscillate in a left-right direction, wherein the arc sensor adjustment device is further configured to carry out a calibration operation of obtaining the welding current or the welding voltage while power is supplied to the welding torch from the welding power source and the welding torch is caused to oscillate in an up-down direction, and is further configured to calculate an adjustment value on the basis of the welding current or welding voltage obtained through the calibration operation and calculate a correction amount for correcting a position of the welding torch in the copying control on the basis of the adjustment value.

Another aspect of the present disclosure is an arc sensor adjustment method used in a welding system that carries out copying control of a welding torch, the method including carrying out a calibration operation of obtaining a welding current or a welding voltage while power is supplied to the welding torch and the welding torch is caused to oscillate in an up-down direction, and calculating an adjustment value on the basis of the welding current or welding voltage obtained through the calibration operation and calculating a correction amount for correcting a position of the welding torch in the copying control on the basis of the adjustment value.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
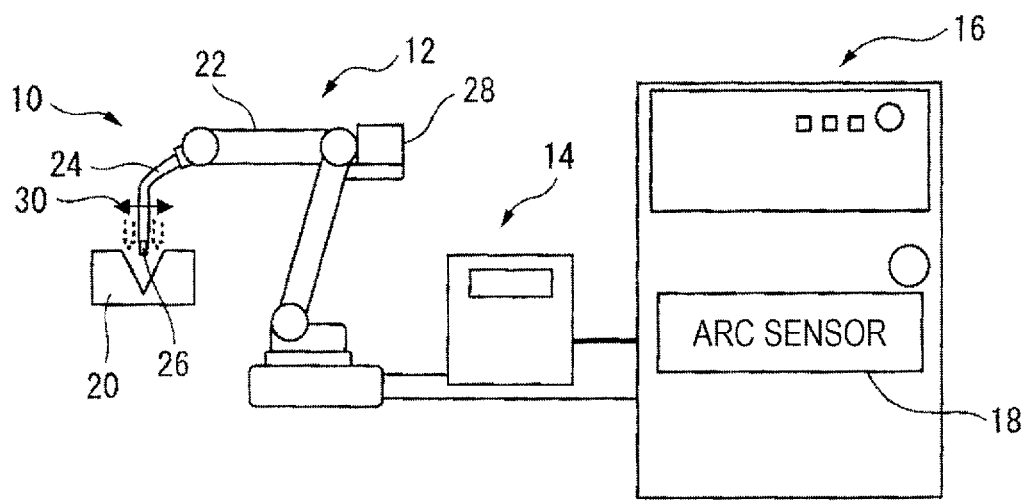
FIG. 1 is a diagram illustrating a schematic configuration of a welding system including an arc sensor adjustment device according to one embodiment of the present disclosure.

FIG. 1 is a diagram illustrating an example of the configuration of a welding system 10 according to one embodiment of the present disclosure. The welding system 10 includes an arc welding robot (called simply a "robot"

hereinafter) 12, an arc welding power source 14, a robot controller 16, and an arc sensor 18 configured to detect a weld line on an object to be welded (a workpiece) 20 using characteristics of a welding arc. The welding system 10 is configured as an arc welding robot system (an arc sensor welding system) that carries out arc welding on the workpiece 20 while performing copying control of the weld line.

The robot 12 is a six-axis articulated robot, for example, including a movable part 22 such as a robot arm, a welding torch 24 mounted on the movable part 22 (a tip of the arm, in the example illustrated), and a wire supply device 28 configured to supply welding wire 26 to the welding torch 24. The robot 12 is configured to be capable of moving the welding torch 24 relative to the workpiece 20. Additionally, the robot 12 is configured to cause the welding torch 24 to oscillate in the left-right direction (weaving) to capture and measure a welding current value or a welding voltage value for arc sensor correction when executing arc welding, and causes the welding torch 24 to oscillate in the up-down direction (reciprocating movement) to capture and measure a welding current value or a welding voltage value for calibration when carrying out calibration for the arc sensor 18, which will be described later.

The arc welding power source 14 is configured to supply power to the welding torch 24 for carrying out the above-described arc welding and calibration. The arc welding power source 14 can measure the welding current or welding voltage during arc welding or calibration, but the measurement of the welding current or the welding voltage can also be carried out by a measurement device separate from the arc welding power source 14. Measurement data pertaining to the welding current or welding voltage, such as the measured welding current value, is sent to the arc sensor 18.

The robot controller 16 is configured to control the motion of the robot 12, and in the present embodiment, send a command pertaining to arc welding to the arc welding power source 14 and at the same time control the movement (copying operation) and weaving of the welding torch 24 by the robot 12 in particular. Note that in the present embodiment, the robot 12 and the robot controller 16 may function as an oscillation device that causes the welding torch 24 to oscillate, and the robot controller 16 may also function as an adjustment device for the arc sensor 18. However, the arc sensor adjustment function may be given to another device such as a personal computer.

The arc sensor 18 is configured to adjust synchronization between the welding current or welding voltage and the oscillating movement of the welding torch 24 when carrying out welding in which the welding torch 24 is caused to weave (oscillate) in the left-right direction while power is supplied to the welding torch 24 from the welding power source 14. On the basis of the welding current or welding voltage measured at the arc welding power source 14 and a weaving command issued by the robot controller 16 (e.g. a waveform expressing positions of the welding torch 24, as in the graph 40 illustrated in FIG. 5), the arc sensor 18 calculates a movement correction amount (or a reference change amount) for causing the robot 12 (the welding torch 24) to copy a weld line on the workpiece 20, and applies the calculated movement correction amount in the copying control. The calibration, which will be described later, is for calculating an adjustment value during the copying control by the arc sensor 18 on the basis of a welding current or a welding voltage captured through calibration operations, which will be described later. In the illustrated example, the arc sensor 18 is included in the robot controller 16 in the form of a processor, etc. However, the arc sensor 18 can also be configured as a device separate from the robot controller 16, as hardware such as a personal computer.

Figure 2:
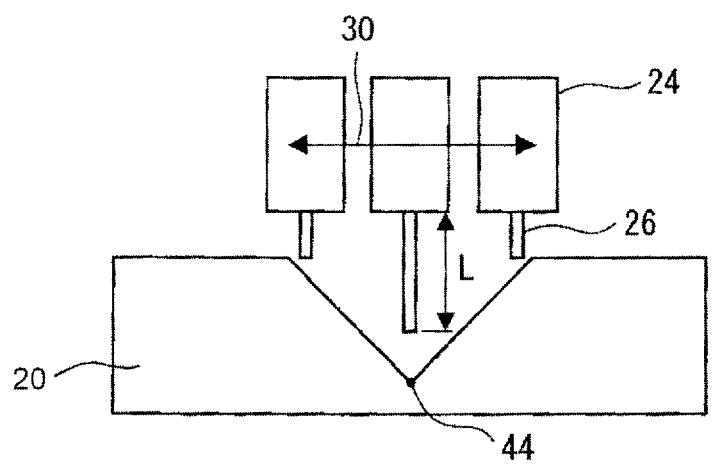
FIG. 2 is a schematic diagram illustrating weaving in a left-right direction.
Figure 3:
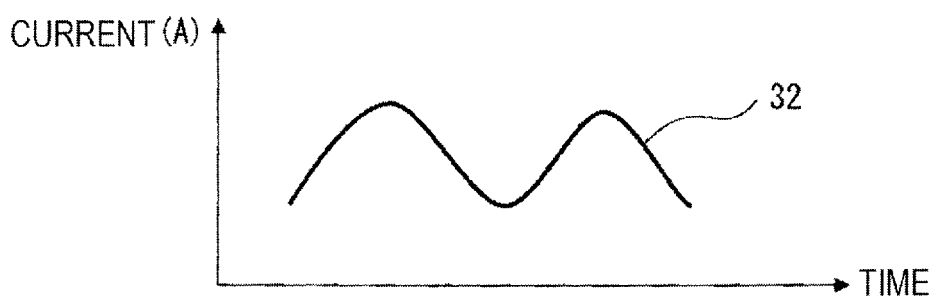
FIG. 3 is a graph illustrating an example of a change in welding current during weaving in the left-right direction.

FIG. 2 is a diagram schematically illustrating a relationship between the weaving motion and the welding current during copying welding. For example, when the workpiece 20 to be welded has a V shape in a cross-section, that is, when carrying out groove welding, the robot arm 22 is caused to weave in the left-right direction indicated by the arrow 30 while power is supplied to the welding torch 24 from the welding power source 14, and the welding torch 24 oscillates in the left-right direction relative to the joint (the groove) in the workpiece 20 as a result. A welding current difference is generated due to changes in a length L at which the welding wire 26 protrudes from the welding torch 24 (to be more specific, a distance from the tip of the welding torch 24 (a welding tip) to the tip of the welding wire 26) at this time, and a waveform of the welding current becomes as shown in the graph 32 in FIG. 3. Specifically, the welding current value is minimum in the center of the groove, and peaks (is maximum) at the left and right ends.

Figure 4:
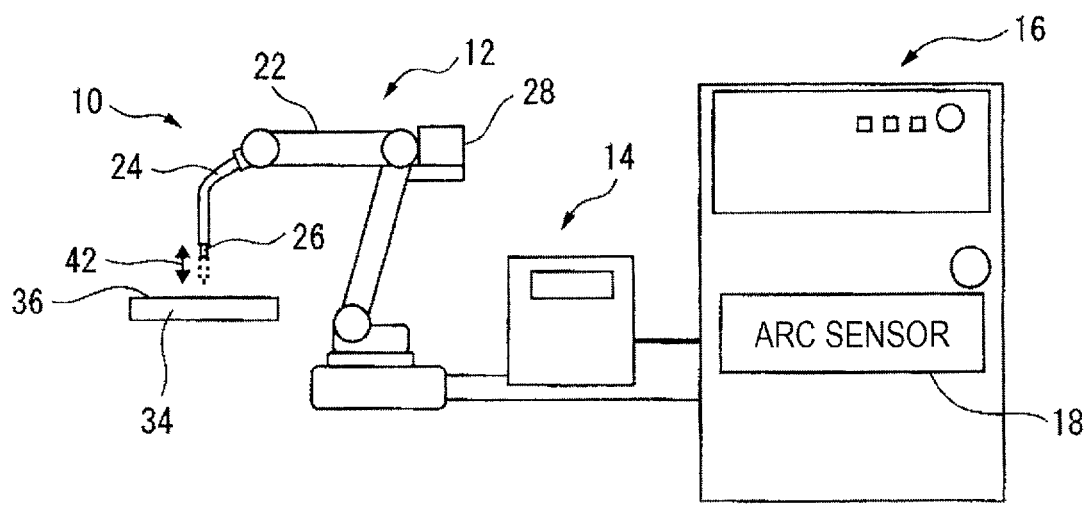
FIG. 4 is a diagram illustrating an example of a state in which calibration is carried out in the welding system illustrated in FIG. 1.

FIG. 4 is a diagram illustrating an example of calibration carried out on a workpiece 34 having a flat surface prior to actual arc welding, by using the system illustrated in FIG. 1. In the present embodiment, the robot arm 22 is caused to weave in the up-down direction while power is supplied to the welding torch 24 from the welding power source 14, and the welding torch 24 oscillates toward and away from the plate-shaped workpiece 34, and to be more specific, in a direction perpendicular to a main surface (plane) 36 of the workpiece 34, as a result. In other words, although normal weaving has the welding torch oscillate in the left-right direction (e.g. the horizontal direction), the weaving in the calibration according to the present embodiment has the welding torch oscillate in the up-down direction (e.g. the vertical direction).

Figure 5:
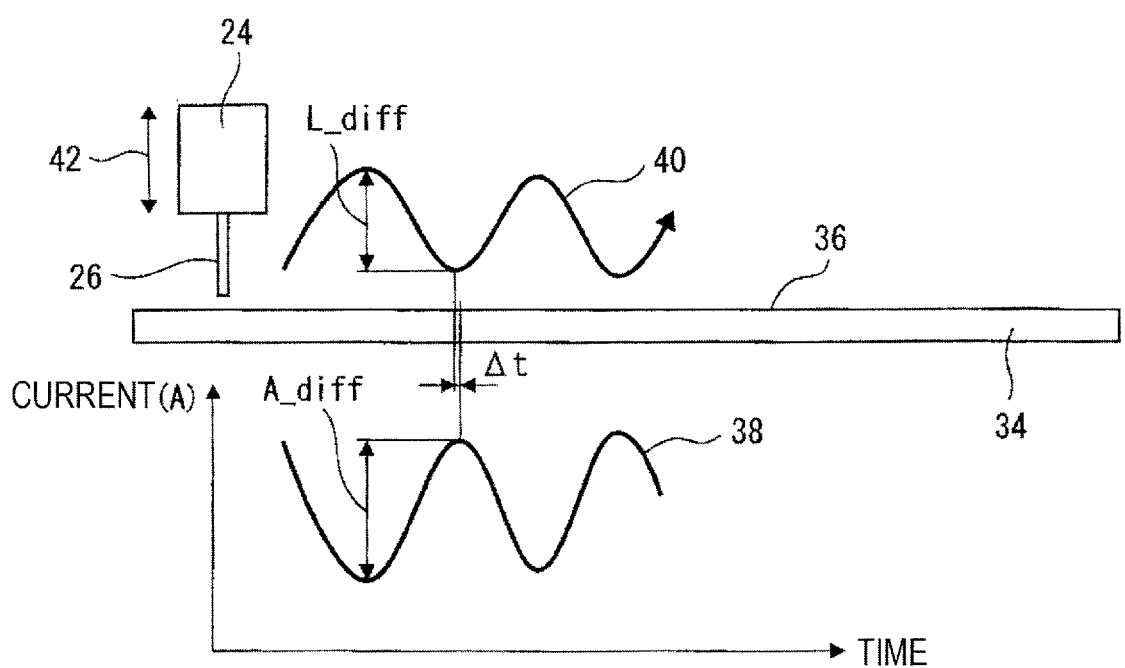
FIG. 5 is a diagram illustrating a graph showing an example of a positional change in a welding torch during weaving in an up-down direction and a graph showing an example of a change in welding current at the same times.

FIG. 5 is a diagram schematically illustrating a relationship between the weaving motion in the up-down direction and the welding current. As described above, the robot arm 22 is caused to weave in the up-down direction while power is supplied to the welding torch 24 from the welding power source 14, and the welding torch 24 oscillates in a direction perpendicular to the main surface 36 of the workpiece 34 as a result. A welding current difference is generated due to a change in the length L at which the welding wire 26 protrudes from the tip of the welding torch 24 at this time, and the waveform of the welding current becomes as shown in the graph 38. Specifically, the welding current value is minimum when (the tip of) the welding torch 24 is furthest from the workpiece 34 (an uppermost point in the up-down movement), and peaks (is maximum) when (the tip of) the welding torch 24 is closest to the workpiece 34 (a lowermost point in the up-down movement). In the present embodiment, the calibration operations, which capture the welding current or the welding voltage while power is supplied to the welding torch 24 from the welding power source 14 and the welding torch 24 is caused to oscillate in the up-down direction, are carried out by the arc sensor adjustment device in this manner.

A displacement amount in the up-down direction weaving is controlled by the robot controller 16 during the calibration operations, and thus an up-down displacement amount of the welding torch 24 can be calculated accurately, as indicated by the graph 40. Generally speaking, during welding, the arc length (the distance from the wire tip to the workpiece) is substantially constant, and thus the displacement amount of the welding torch is substantially equal to the displacement amount of the length by which the welding wire protrudes.

A displacement amount (an amount of change in the length at which the wire protrudes) per unit amount of welding current (e.g. per 1 A (ampere)) can easily be calculated from the stated displacement amount and an amount of the difference between the maximum value and the minimum value of the welding current waveform captured through the calibration operations.

On the other hand, during weaving in the left-right direction, it is necessary to consider the angle of the groove, and the tendency of the welding wire to bend may result in the current waveform being asymmetrical in the left-right direction. Therefore, it may be difficult to find the displacement amount per unit amount of welding current (e.g. per 1 A of current). Thus, during weaving in the left-right direction, a conversion value (gain) used when finding the movement correction amount of the welding torch from the current difference has typically been handled as a dimensionless quantity. However, in the present embodiment, the gain can be handled as a "movement correction amount per unit amount (e.g. per 1 A)", and is thus a value that an operator can understand intuitively with ease. In other words, in the present embodiment, the displacement amount per 1 A of welding current is taken as an adjustment value (adjustment parameter), and on the basis of this adjustment value (calibration result), a correction amount for correcting the position of the welding torch 24 during copying control that causes the welding torch 24 to oscillate in the left-right direction can be calculated.

For example, when the gain is represented by G, an up-down variation range of the welding torch during calibration is represented by L diff, and a variation range of the welding current is represented by A diff, the gain G can be calculated through the following Equation (1). Although (mm/A) can be used as the unit of the gain, for example, any unit can be used as long as the unit represents "the movement correction amount (length) per 1 A". Another unit that is easier for an operator to understand intuitively than a dimensionless quantity may be used instead of the "movement correction amount per 1 A".

$$G = L\_diff / A\_diff (mm/A) \quad (1)$$

Although using the movement correction amount found as described above does enable more accurate correction than in the related art, a parameter specifying a multiplication factor for the correction amount may be used in cases where the sensitivity is to be increased. Alternatively, the correction amount per 1 A calculated through the calibration may be varied within a set range.

In copying welding using an arc sensor, it is ideal for the actual welding current/voltage to be at a peak value when the welding torch is located at an end of the weave, but in reality, a delay in a servo trajectory relative to an instructed trajectory, and/or a delay caused by welding phenomena, etc., may be generated. There have been proposals in the related art for detecting a peak value from changes in the welding current during weaving welding of a groove and causing the instructed trajectory to match the timing of the sampling of the welding current. However, in the related art, the weaving has been carried out on the groove shape of an actual workpiece, and there has thus been a risk of factors such as dimensional error in the workpiece and bending in the welding wire making the estimation and correction of delay times inaccurate.

Thus in the present embodiment, on the basis of the welding current (waveform) when the welding torch 24 oscillates up and down and the weaving command issued by the robot controller 16, the arc sensor adjustment device calculates/estimates a delay time Δt (the adjustment value) until the welding current is captured in response to the instruction made by the robot controller 16 to the robot 12, in each period of the weaving, as can be seen by comparing the current waveform (graph 38) with the displacement of the welding torch (graph 40) in FIG. 5. The arc sensor adjustment device then calculates the correction amount for correcting that delay time on the basis of the delay time Δt. By applying the calculated correction amount in the copying control, the weaving of the robot can be synchronized with the welding current waveform. Compared to the current waveform captured during weaving in the left-right direction, the current waveform captured by the weaving in the up-down direction is a stable waveform affected little by the dimensional error in the workpiece or bending in the wire, which enables accurate estimation during the synchronization.

In the example illustrated in FIG. 4, during calibration, weaving is carried out in the up-down direction using the plate-shaped workpiece 34, and thus the displacement amount of the welding torch 24 relative to the workpiece 34 can be calculated accurately. By using the delay time and/or the gain calculated through the calibration, appropriate correction can be carried out during the left-right weaving in the actual welding, and thus highly-accurate copying control is possible. Additionally, in the calibration, it is not necessary to use a workpiece actually used in welding (e.g. a groove shape), and thus highly-accurate calibration can be carried out in a simple environment by using a flat plate. Although the workpiece used in the calibration is not limited to a flat plate shape, a shape with which the distance between the workpiece and the welding torch can be found easily and accurately is preferable. Furthermore, it is preferable that the workpiece used in the calibration is made of the same material as the workpiece that is actually to be welded. Additionally, during the calibration, an even more accurate delay time and gain can be calculated by carrying out the same operations multiple times on workpieces having the same shape and finding an average thereof.

In the present disclosure, the "up-down direction" with respect to the oscillation (weaving) of the welding torch refers to a direction that, as indicated by the arrow 42 in FIG. 4 or FIG. 5, is perpendicular to the travel direction of the welding torch 24 along the weld line and is parallel to a plane defined by the travel direction and the direction in which the welding wire 26 protrudes from the welding torch 24, and in most cases, is the vertical direction. In other words, an amount of variation in a minimum distance between (the tip of) the welding torch and the weld line while the welding torch is oscillating in the "up-down direction" matches the displacement amount of the welding torch. With a groove shape such as that illustrated in FIG. 2, the weld line corresponds to a trough line 44. However, when a plate-shaped workpiece is used, as in the calibration, any desired line (preferably, a straight line) can be set on the workpiece as the weld line.

The "left-right direction" with respect to the oscillation (weaving) of the welding torch refers to a direction that, as indicated by the arrow 30 in FIG. 1 or FIG. 2, is perpendicular to the travel direction (the direction perpendicular to the drawing) of the welding torch 24 along the weld line 44 and is perpendicular to a plane defined by the travel direction and the direction in which the welding wire 26 protrudes from the welding torch 24 (the vertical direction, in FIG. 2), and in most cases, is the horizontal direction. Thus, in the present disclosure, the left-right direction and the up-down direction are perpendicular to each other.

The foregoing embodiment has described an example in which, during the calibration operations carried out by the arc sensor adjustment device, the welding current is obtained or measured while power is supplied to the welding torch from the welding power source and the welding torch is oscillated in the up-down direction. However, the welding voltage (arc voltage) can be obtained or measured instead of the welding current, and in this case, the servo delay and gain can be estimated (the adjustment value can be calculated) in the same manner as when the welding current is used. The estimation of the delay time and the gain may be carried out separately, but can also be carried out simultaneously in a single instance of calibration.

Additionally, although the above-described embodiment uses a robot such as the vertical articulated robot 12 as a constituent element of the oscillation device for moving the welding torch 24 during weaving, the configuration is not limited thereto. For example, a device including means for gripping the welding torch 24 and a plurality of (e.g. three) linear motion mechanisms, each capable of moving the means along a plurality of mutually-orthogonal axes (e.g. three axes, namely X, Y, and Z axes), can be used as well.

According to the present disclosure, rather than adjusting the delay time and adjusting the gain during weaving on a groove shape, etc., that is an actual object for arc welding, welding is carried out on a flat plate placed horizontally while causing the welding torch to oscillate so as to cyclically repeat movement in which the welding torch gradually approaches the flat plate and gradually recedes from the flat plate (i.e., while weaving in the up-down direction). The delay time and the gain can be estimated on the basis of an amplitude (variation range) of the weaving and changes in the welding current (or arc voltage) at that time. When estimating the gain, a correction amount per unit of current difference (e.g. 1 A) is found at a unit length (e.g. mm), and thus a user can make adjustments intuitively. Additionally, with up-down weaving, the tendency of the wire to bend has little effect on changes in the current waveform, and a dimensional error (variations) in the flat-plate workpiece is low compared to a workpiece having a groove shape, etc., and thus a highly-accurate adjustment value can be calculated.

According to aspects of the present disclosure, in welding using an arc sensor, the position of a welding torch can be corrected accurately and the accuracy of copying control can be greatly improved, and the arc sensor can be calibrated in a simple welding environment.

While the invention has been described with reference to specific embodiments, it will be understood, by those skilled in the art, that various changes or modifications may be made thereto without departing from the scope of the following claims.

The invention claimed is:

1. An arc sensor adjustment device in a welding system comprising:
   a welding torch;
   a welding power source configured to supply power to the welding torch;
   an oscillation device configured to cause the welding torch to oscillate; and
   an arc sensor configured to obtain a welding current or a welding voltage generated when copying control is carried out while power is supplied to the welding torch from the welding power source and the welding torch is caused to oscillate in a left-right direction,
   wherein the arc sensor adjustment device is further configured to carry out a calibration operation while the welding torch is caused to oscillate in an up-down direction, the calibration operation including:
      obtaining the welding current or the welding voltage while power is supplied to the welding torch from the welding power source and the welding torch is caused to oscillate in the up-down direction,
      calculating an adjustment value on the basis of a time delay between the welding current or welding voltage and a displacement of the welding torch due to the oscillating in the up-down direction, and
      calculating a correction amount for correcting a position of the welding torch in the copying control on the basis of the adjustment value, and
   wherein based on the correction amount calculated during the calibration, the arc sensor adjustment device is further configured to adjust synchronization between the welding current or welding voltage generated during welding and the oscillating movement of the welding torch while causing the welding torch to oscillate in the left-right direction.

2. An arc sensor adjustment device in a welding system comprising:
   a welding torch;
   a welding power source configured to supply power to the welding torch;
   an oscillation device configured to cause the welding torch to oscillate; and
   an arc sensor configured to obtain a welding current or a welding voltage generated when copying control is carried out while power is supplied to the welding torch from the welding power source and the welding torch is caused to oscillate in a left-right direction,
   wherein the arc sensor adjustment device is further configured to carry out a calibration operation while the welding torch is caused to oscillate in an up-down direction, the calibration operation including:
      obtaining the welding current or the welding voltage while power is supplied to the welding torch from the welding power source and the welding torch is caused to oscillate in the up-down direction,
      calculating an adjustment value on the basis of a time delay between the welding current or welding voltage and a displacement of the welding torch due to the oscillating in the up-down direction, and
      calculating a correction amount for correcting a position of the welding torch in the copying control on the basis of the adjustment value, and
   wherein based on the correction amount calculated during the calibration, the arc sensor adjustment device is further configured to calculate a movement correction amount of the welding torch during welding while causing the welding torch to oscillate in the left-right direction.

3. An arc sensor adjustment method used in a welding system that carries out copying control of a welding torch, the method comprising:
   carrying out a calibration operation while the welding torch is caused to oscillate in an up-down direction, the calibration operation including:
      obtaining a welding current or a welding voltage while power is supplied to the welding torch and the welding torch is caused to oscillate in the up-down direction,
      calculating an adjustment value on the basis of a time delay between the welding current or welding voltage and a displacement of the welding torch due to the oscillating in the up-down direction, and calculating a correction amount for correcting a position of the welding torch in the copying control on the basis of the adjustment value; and based on the correction amount calculated during the calibration, adjusting synchronization between the welding current or welding voltage generated during welding and the oscillating movement of the welding torch while causing the welding torch to oscillate in the up-down direction.

4. An arc sensor adjustment method used in a welding system that carries out copying control of a welding torch, the method comprising:

carrying out a calibration operation while the welding torch is caused to oscillate in an up-down direction, the calibration operation including:

obtaining a welding current or a welding voltage while power is supplied to the welding torch and the welding torch is caused to oscillate in the up-down direction, calculating an adjustment value on the basis of a time delay between the welding current or welding voltage and a displacement of the welding torch due to the oscillating in the up-down direction, and calculating a correction amount for correcting a position of the welding torch in the copying control on the basis of the adjustment value; and based on the correction amount calculated during the calibration, calculating a movement correction amount of the welding torch during welding while causing the welding torch to oscillate in the up-down direction.

\* \* \* \* \*